3,177,188
OLEFIN POLYMERIZATION PROCESS UTILIZING
A FREE METAL AS THE CATALYST
Gardner C. Ray and Forrest N. Ruehlen, Bartlesville, Okla., assignors to Phillips Petroleum Company, a corporation of Delaware
No Drawing. Filed June 27, 1960, Ser. No. 38,760
15 Claims. (Cl. 260—93.7)

This invention relates to the polymerization of olefins. In one aspect this invention relates to an improved process for the polymerization of olefins.

A variety of reactions and processes for the polymerization of olefins is known in the art. Many of these processes involve contacting the olefin monomer with a suitable catalyst under conditions of elevated temperature and pressure to produce a polymer intimately associated with the catalyst. Many of these proposed processes require an expensive catalyst and/or expensive and difficult activation procedures for improving the activity of the catalyst for polymerization of the olefin monomers.

We have discovered a process for utilizing inexpensive and normally inactive elements as a catalyst. By the method of this improvement, reaction rates and yields are obtained which make possible the utilization of catalysts heretofore thought to be either inactive or of such negligible activity that it was undesirable to use these catalysts for the polymerization of olefin monomers. By the method of this invention increased amounts of useful polymer compositions are obtained per unit of catalyst.

An object of this invention is to provide an improved olefin polymerization process.

A further object of this invention is to provide an olefin polymerization process whereby increased yields of polymer are obtained per unit of catalyst.

Another object of this invention is to provide a more active catalyst for the polymerization of olefins.

Still another object of this invention is to provide a method of producing a polymer intimately associated with a catalyst.

Other objects and advantages of this invention will be apparent to one skilled in the art upon reading this disclosure and the claims.

These objects are broadly accomplished by contacting an olefin monomer with a finely divided catalyst selected from the group consisting of carbon, boron, titanium, silicon, iron and chromium under polymerization conditions while continuously exposing fresh catalyst surfaces active for polymerization and recovering polymer.

In one aspect of the invention the surfaces are continually exposed by grinding.

In another aspect of the invention the catalyst is first activated by continuously exposing fresh catalyst surfaces active for polymerization and then said olefins are contacted with said catalyst under polymerization conditions while continually exposing fresh catalyst surfaces active for polymerization.

Materials which are polymerized in accordance with this invention are polymerizable hydrocarbons and preferably olefins containing a $CH_2=C<$ group. These olefinic hydrocarbons most generally preferred are the 1-olefins containing from 2 to 8 carbon atoms per molecule and having no branching nearer the double bond than the 4-position. Examples of compounds that can be polymerized by this process include ethylene, propylene, 1-butene, 1-pentene, 4-methyl-1-pentene, 1-octene, 3-methyl-1-butene and 1-heptene. Branched chain olefins such as isobutylene can also be used. Examples of the di- and polyolefinic hydrocarbons in which the double bonds are in nonconjugated positions and which can be used in accordance with this invention are 1,5-hexadiene, 1,4-pentadiene, and 1,4,7-octatriene and the like. Cyclic olefins such as cyclohexene and 4-vinylcyclohexene can also be used. Mixtures of the foregoing polymerizable hydrocarbons can be polymerized, for example, ethylene and propylene, ethylene and 1-butene, propylene and 1-butene, and the like. It is also possible to polymerize materials such as styrene, alkyl-substituted styrenes, and the like in accordance with the present process. This invention is also applicable to the polymerization of a monomeric material comprising conjugated dienes containing from 4 to 8, inclusive, carbon atoms per molecule. Examples of conjugated dienes which can be used include 1,3-butadiene, 2-methyl-1,3 butadiene, 2,3-dimethyl-1,3 butadiene, 2-methyl-1,3 pentadiene, chloroprene, 1-cyanobutadiene, 2,3-dimethyl-1,3 pentadiene, 2-methyl-3 ethyl-1,3 pentadiene, 2-methoxybutadiene, 2-phenylbutadiene, and the like. It is within the scope of the invention to polymerize such conjugated dienes either alone or in admixture with each other and/or with one or more other compounds containing an active $CH_2=C<$ group which are copolymerizable therewith. Included among these latter compounds are monoolefins such as those described herein above. Other examples of compounds which are copolymerizable with one or more conjugated dienes are styrene, acrylonitrile, methacrylonitrile, methylacrylate, methylmethacrylate, vinyl acetate, vinylchloride, 2-methyl-5-vinylpyridine, 5-methyl-2-vinylpyridine, 2-vinylpyridine, 4-vinylpyridine, and the like. Still other polymerizable monomers which may be employed include the vinylquinoline and the vinylisoquinolines such as 2-vinylquinoline, 4-hexol-5-vinylquinoline, 1,8 divinylisoquinoline and the like. The above list of monomers is not intended to be exhaustive but merely indicates the broad range of compounds which may be polymerized by the method of this invention.

The catalysts of this invention are relatively common materials which are relatively inexpensive and which heretofore have been considered inactive or which have been considered to have such negligible activity as to be inefficient for the polymerization of olefin monomers. By the method of this invention these materials are made sufficiently active to produce significant quantities of polymer. Although the method of this invention is applicable to any catalyst known to be active for the polymerization of olefin monomers, the improved activity and yield inherent in this invention are particularly advantageous in those materials not heretofore known to be active catalysts. Included in this preferred group are materials selected from the group consisting of carbon, boron, titanium, silicon, iron and chromium. Preferably these materials are in an elemental state, that is, they are not combined with another element, such as oxygen, which would be detrimental to the activity of said catalyst for the polymerization of olefin monomers. However, some impurities are tolerable, for instance, when using carbon as the catalyst, it has been found that various commercial carbon blacks and graphite are particularly suitable even though these carbonaceous materials are not chemically pure. Suitable carbon blacks include the finely divided product made by incomplete combustion or thermal decomposition of hydrocarbons, sometimes designated as channel, furnace and thermal blacks. While natural graphite is applicable, the purer products obtained by electric furnace processes, e.g., the Acheson process, are preferred. These products are available as powders, that is, with a particle size less than about 60 mesh, which can be conveniently handled.

Included among the materials whose activity for the polymerization of olefins is significantly improved by the method of this invention are metals selected from the group consisting of boron, titanium, silicon, iron and chromium. It is particularly advantageous to have the metals in the elemental state and to remove detrimental contaminants, such as oxygen, $CO_2$ and water, therefrom by any suitable method such as degassing at elevated temperatures and reduced pressures of activating said catalyst in the presence of an inert gas.

While the above materials are excellent catalysts when used in the process of this invention, co-catalysts or activators may be used in conjunction therewith, if desired, whereby the rate of polymerization and/or yield is increased even more. Exemplary of such a co-catalyst system is carbon and aluminum. Obviously many other variations may be made in the process without departing from the scope of this invention.

Since it has been theorized that it is the freshly formed surface on the material which exposes active catalyst sites to the polymerizable olefin monomer in the process of this invention, it follows that best results are obtained by using catalyst particles having extremely large surface areas. It is particularly desirable to utilize small particles of a soft material, such as titanium and aluminum, since the action of the grinding means may tend to flatten large aggregates or chunks of a soft material. Most of the materials useful in this invention are actually composed of aggregates of very fine particles and the grinding step primarily results in separation of the aggregates to the individual particles with only a few of the individual particles being fractured. Nevertheless, whatever the mechanism of the grinding action the number of freshly exposed surfaces is increased thereby improving the activity of said catalyst. While grinding is known to cause an increase in surface area due to fracturing of the particles and the breaking down of aggregates, the increased activity of the catalyst is apparently not simply due to an increase in surface area. The reason for the increased activity is not fully understood but is believed to be due at least in part to the formation of freshly created surfaces which are in a metastable state. This invention is not limited to any theory attempting to explain the mechanism of our improvement.

The amount of catalyst which is used for polymerization will be dependent upon the monomer and means used for continually exposing fresh surfaces active for polymerization. For instance, when using a ball mill as the grinding means, it is known to those skilled in the art that grinding efficacy is a function of the number of baffles and location thereof within the ball mill, the number, size, total weight and the type of balls, as well as the amount and type of material being ground. Also the number of revolutions per minute of the ball mill is an important consideration. We have found that when using a 2-liter ball mill with 3/8 inch stainless steel balls, optimum grinding efficacy is obtained by filling the ball mill 1/5 to 1/2 full of balls, preferably 1/3 full, and then filling the ball mill with another 1/5 to 1/2 volume, preferably 1/3 volume, of catalyst and using a mill rate in the range of 100 to 150 r.p.m. preferably 115 to 140 r.p.m. The grinding time during the polymerization step will vary widely depending on the above factors but preferably is in the range of 0.1 to 2,000 hours, more preferably 10 hours to 1,500 hours. The optimum grinding rates, ball size, etc. can be readily determined by routine tests by one skilled in the art.

The type of grinding equipment used in the process of this invention to continually expose fresh catalyst surfaces active for the polymerization of monomers is not critical. Conventional ball mills constructed of glass, porcelain, steel or other materials of construction inert to the catalyst and the monomer are satisfactory. The grinding aid used in the ball mills can be ordinary flint pebbles, porcelain balls, stainless steel or iron balls, or any dense grinding aid inert to the catalyst and monomer. In addition to conventional ball mills, containers capable of being rocked or shaken and charged with the catalyst and monomer in the presence of a grinding aid can also be used. In still another method, grinding is effected in a colloidal mill wherein closely spaced rotating plates cause grinding of solid particles as they pass through the orifice formed by the plates. Impinging jets of flowing catalyst can also effect satisfactory grinding. Any other suitable means for continually exposing fresh catalyst surfaces may be used such as atomizing a molten metal into an inert atmosphere, reduction of a metal oxide with hydrogen, dissolving away part of an alloy, preparing the catalyst in a colloidal form, and the like.

Preferably the grinding means comprises a rotating ball mill wherein the action of the continual contacting of the balls creates high localized temperature and pressure conditions and promotes reactions which are otherwise difficult to initiate.

By the method of this invention polymerization is effected while continually exposing fresh catalyst surfaces, such as by grinding in a ball mill. Preferably the grinding is effected in an inert atmosphere containing the monomer to be polymerized. During grinding catalyst contaminants, e.g. oxygen and water vapor, are excluded. Preferably the polymerization takes place in the gas phase. It is within the scope of the invention to polymerize the monomers while grinding the catalyst in a liquid diluent. Suitable diluents include paraffin hydrocarbon diluents such as acyclic paraffins, such as propane, isobutane, n-pentane, isopentane, isooctane and the like, and alicyclic hydrocarbons, such as cyclohexane, methylcyclohexane and the like. However, it has been found that improved rates and yields are obtained by polymerizing said monomer and grinding said catalyst in the gaseous phase. Apparently, the liquid acts as a lubricant for the particles of catalyst thereby reducing the tendency of the particles to fracture or otherwise expose fresh surfaces. Therefore, polymerization is preferably effected while maintaining a reaction temperature and pressure sufficiently high to maintain the monomer and diluent, if any, in the vapor state. Pressures in the range of 0.1 millimeter of mercury to as high as 1,000 p.s.i. and higher can be employed. These pressures can be readily controlled by regulating the rate at which the monomer is introduced to the polymerization zone. The polymerization temperature is preferably maintained in the range of about $-10°$ F. to $400°$ F., more preferably from $0°$ F. to $300°$ F. Any suitable means for controlling temperature and pressure known to the art may be used. One suitable method for maintaining the desired conditions includes the use of a jacketed ball mill.

In one embodiment of this invention the catalyst is activated prior to contacting the catalyst with monomer. In this embodiment the catalyst is treated to continuously expose catalyst surfaces active for the polymerization of the monomer. Preferably this activation step utilizes the same grinding means used during the polymerization step, such as a ball mill. During this activation step, as in the polymerization step, it is preferred that all catalyst contaminants be excluded and removed from the grinding zone. This may be done by any suitable method known to the art. One suitable method of excluding oxygen and water vapor and other contaminants during the activation step is to grind in the presence of a dry, oxygen-free, inert gas such as hydrogen, helium and argon. However, when using materials, such as metals, containing adsorbed oxygen, surface oxides, water vapors and other contaminants, it is preferable to activate the catalyst at sub-atmospheric pressures while removing volatile materials. In addition, it is preferable to elevate the temperature so as to effect rapid degassing of the catalyst. The temperatures employed for activation of the catalyst during the pregrinding step can vary over a wide range, preferably from $0°$ C. to $700°$ C. Pressures during the activation step are preferably sub-atmospheric, more preferably below about $10^{-3}$ millimeters of mercury and even more preferably between $10^{-4}$ and $10^{-8}$ millimeters of mercury. Grinding periods required for activation will vary widely depending on the grinding means and the catalyst being activated but preferably are in the range of 0.1 to 1,000 hours.

We have discovered that this activation step often substantially reduces the period of time necessary for the polymerization step. For instance, when not using the pre-grinding step or pre-activation step, it is often necessary to grind the catalyst in the presence of the olefin for a period of many hours to attain significant polymerization yields. However, when subjecting the catalyst to the activation step of this invention to expose fresh catalyst surfaces active for polymerization and then introducing the monomer to the freshly exposed surfaces in the absence of catalyst contaminants while continuing the grinding of the catalyst, it has been found that significant yields of polymer may be obtained in a few minutes, for example, five to thirty minutes. The polymerization step is terminated when a desired amount of polymer has formed. Although the process of this invention has been described herein as a batch process, it is obvious to those skilled in the art that the method could be adapted to continuously produce a polymer.

At the end of the polymerization step the polymer and catalyst are removed from the grinding means by any method convenient to the art and subjected to such additional treatments as are desired to effectively use the polymer. Although the ratios of polymer and catalyst will depend on the original ratios of catalyst and monomer as well as the polymerization conditions, it has been found that part of the polymer is sometimes intimately associated with the catalyst. Surprisingly, the polymers produced by the method of this invention are substantially insoluble in toluene even at elevated temperatures, such as the boiling point of toluene. This is particularly true in the case of polymers of ethylene, 1-butene, and 1,3-butadiene. This would seem to indicate the substantial absence of low molecular weight polymer and the presence of high molecular weight polymer and/or a chemically bonded polymer-catalyst complex.

The products can be subjected to additional treatment such as extraction or fractionation to remove low molecular polymer. For example, the products can be extracted with hydrocarbon liquid such as hexane, octane, benzene, toluene, cyclohexane and the like. These low molecular weight polymers can then be separated from solvent and suitable use made thereof.

Many uses can be made of the polymer-catalyst product, such as by molding into a variety of shapes and forms. For example, a molded boron-catalyst composition is an effective radiation shield. When using carbon black as the catalyst the product is effectively a filled carbon which has a wide variety of applications.

In a specific embodiment of the invention a catalyst, such as carbon black, is introduced into a grinding means, such as a ball mill partially filled with stainless steel balls. The ball mill is sealed and then rotated while being subjected to a sub-atmospheric pressure while maintaining the temperature within the ball mill in the range of 0° C. to 700° C. At least a portion of this temperature elevation is supplied by the kinetic energy of the rotating balls and the remainder may be supplied by an externally applied heat exchange means, such as a steam jacket. In some instances, a water cooling jacket is necessary. The grinding is continued for a period of 0.1 to 1,000 hours while maintaining the vacuum on said ball mill and removing the gaseous material therefrom. At the end of this activation period extreme care is exercised to insure that no catalyst contaminants are permitted to be introduced into the ball mill. If desired, the catalyst may be transferred into a separate polymerization zone so long as adequate steps are taken to prevent contact of the freshly exposed catalyst surfaces to a significant quantity of a catalyst contaminant such as oxygen and water vapor.

When the same grinding means is used for both the activation and polymerization steps, it may be desirable to cool the grinding means to the polymerization temperature. The olefin monomer is then introduced into the polymerization zone containing the grinding means and the activated catalyst and the grinding of the catalyst is continued to continually expose fresh surfaces active for polymerization during the polymerization step. The temperature of the polymerization zone is maintained in the range of about −10° F. to about 400° F. Monomer is either continuously or periodically added to the polymerization zone to maintain a pressure sufficient to maintain the monomer in the vapor state at the desired temperature. Polymerization is continued until the desired quantity of polymer has been produced and then terminated by decreasing the temperature to ambient temperature and terminating the revolving of the ball mill. The product thus produced is a dry admixture of polymer and catalyst which is then separated from the balls by any convenient separation means, such as size separation. If desired, the polymer-catalyst mixture may then be treated to remove low molecular weight polymer, such as by extraction or fractionation.

Having described the invention by a specific embodiment, the following examples will further illustrate the process of this invention.

In the following examples the grinding means consisted of a steel container with a 10 centimeter inside diameter, a volume of about 1700 cc. and equipped with a rotatable seal with provision for admission of catalyst and monomer. This container was charged with about 6480 stainless steel balls which were 0.375 inch in diameter. The catalyst was then introduced into the container and degassed by heating at 750 to 800° F, at a reduced pressure of below $10^{-4}$ millimeters of mercury for 2 to 4 hours. The reactor was then cooled to ambient temperature and charged to the desired pressure with the olefin monomer taking care not to permit oxygen, water vapor or other catalyst contaminants to be introduced into the container. The reactor was then sealed and rotated at 120 r.p.m. for the activating step at ambient temperatures ranging from 0 to 80° F. for the length of the run. Periodically, generally between 6 and 48 hours, the container was recharged with additional monomer to maintain the pressure shown in the tables in the following examples. The pressure ranges given in the tables below illustrate the maximum pressure immediately after charging with monomer and the lowest pressure observed just prior to recharging. At the end of a run the reactor was vented and the weight of the product was ascertained by weighing. The increase in weight was used to compute the weight percent polymer in the product (catalyst plus polymer).

EXAMPLE I

The data tabulated in Table I below illustrates the polymerization of olefins in the presence of carbon black and graphite using the afore-described procedure.

*Table I.—Polymerization of olefins in the presence of activated carbons*

PART A. CARBON BLACK[1], 36 GRAMS, EMPLOYED AS CATALYST

| Run No. | Monomer | Milling, hr. | Pressure range, mm. of Hg | Polymer, wgt. percent of product |
|---|---|---|---|---|
| 1 | Butadiene | 693 | 0.1–240 | [3] 47.5 |
| 2 | Ethylene | 1,215 | 0.1–816 | [4] 31.8 |
| 3 | Ethylene | 434 | 1–821 | 36.7 |
| 4 | Propylene | 462 | 0.1–301 | 25.0 |
| 5 | Butene-1 | 131 | 153–807 | 11.2 |
| 6 | 50=50 ethylene:1-butene. | 198 | 3–800 | 17.7 |

PART B. GRAPHITE,[2] 36 GRAMS, EMPLOYED AS CATALYST

| | Ethylene | 266 | 8–157 | 5.8 |

[1] A commercial furnace black (Philblack I) which was extracted with toluene and found to have a surface area of 92 square meters per gram.
[2] A commercial grade (Acheson Grade 38) made in an electric furnace and having a surface area of 10 square meters per gram.
[3] Only about 5% of the polymer was extractable by refluxing toluene.
[4] About 26% of the polymer was extractable by refluxing toluene.

The product thus produced was a black, free-flowing moldable powder.

An additional run was made by the procedure hereinbefore described without the presence of the catalyst, that is, with only balls and the monomer present in the ball mill. The mill was operated for several hundred hours without the production of any measurable quantity of polymer.

Another run was made using the procedure of this example with a glass ball mill, containing porcelain balls, at substantially the same load levels, operating conditions and r.p.m. A significant quantiy of polymer was produced but the rate was less than that obtained with the conventional ball mill due to the decreased efficiency of the grinding media.

EXAMPLE II

This example illustrates the polymerization of olefins with different metals activated by the method of this invention. These runs were made using the same apparatus as that hereinbefore described immediately preceding Example I except that the ball mill was connected to a pressurized cylinder of the monomer via a pressure regulator. However, the cylinder capacity was not entirely adequate and recharging of this cylinder was necessary during the run. All the metals were degassed prior to use as described hereinbefore.

*Table II.—Polymerization of olefins with metals activated by grinding*

| Run No. | Metal | Metal, grams | Monomer | Milling, hours | Milling, r.p.m. | Pressure, atmospheres | Polymer wgt. percent of product | Poly. aft. Extract., wgt. percent of product | Notes |
|---|---|---|---|---|---|---|---|---|---|
| 10 | Boron | 26.2 | Ethylene | 64 | 140 | 1-2.1 | 33.3 | 31.3 | a, b. |
| 11 | Titanium | 3.8 | Propylene | 25 | 117 | 1-1.3 | 23.5 | | b, c. |
| 12 | do | 14.8 | Ethylene | 27.6 | 117 | 0.8-1.34 | 38.0 | 36.8 | b, c. |
| 13 | Silicon | 36 | do | 70.5 | 140 | 0-0.4 | 20.3 | 13.0 | b. |
| 14 | Iron | 36 | do | 114.9 | 140 | 1-2.0 | 12.7 | 10.4 | b. |
| 15 | Chromium | 69.6 | do | 21.3 | 120 | 0.8-1.64 | 4.83 | 4.0 | b. | a. The boron powder was milled 137 hours in a helium atmosphere at 70-80° F. before use.
b. All metals were degassed by heating at 400-750° F. for 1-4 hours at reduced pressure (less than $10^{-4}$ mm. Hg).
c. The Si and Ti were less than 20 mesh in size before million. The other metals were powders.

For all runs included in Table II, the product was extracted by refluxing with toluene for 1 to 5 days until free of soluble polymer. As shown by comparison of the values of the weight percent of polymer before and after extraction only a minor amount of polymer was extracted by toluene. If desired the polymer extracted by toluene may be freed of solvent by distillation or any other suitable means.

While certain examples, structures, compositions and process steps have been described for purpose of illustration the invention is not limited to these. Variation and modification within the scope of the disclosure and the claims can readily be effected by those skilled in the art.

What we claim is:

1. A process for polymerizing olefins which comprises subjecting a finely divided catalyst consisting essentially of a member selected from the group consisting of carbon, boron, titanium, silicon, iron and chromium to a temperature of at least 400° F. and a subatmospheric pressure below $10^{-3}$ mm. Hg for a period of time sufficient to remove volatile catalyst contaminants, contacting an olefin monomer with the thus degassed catalyst under polymerization conditions while continually exposing a fresh catalyst surface active for polymerization of said monomer, and recovering a polyolefin product.

2. A process in accordance with claim 1 wherein the step of contacting comprises grinding said degassed catalyst in the presence of said olefin monomer under polymerization conditions to continuously expose fresh catalyst surfaces active for polymerization of said monomer.

3. A process in accordance with claim 2 wherein said catalyst is activated prior to being degassed by an initial grinding.

4. A process in accordance with claim 3 wherein said initial grinding is effected in an inert atmosphere.

5. A process in accordance with claim 4 wherein said initial grinding and said grinding in the presence of said olefin monomer are effected by ball milling.

6. A process in accordance with claim 1 wherein said polymerization conditions comprise a temperature in the range of —10° to 400° F.

7. A process in accordance with claim 1 wherein the step of subjecting comprises grinding said catalyst at an elevated temperature and at a subatmospheric pressure.

8. A process in accordance with claim 1 wherein the step of subjecting comprises grinding said catalyst in an activation zone maintained at said temperature and at said subatmospheric pressure for a period of time sufficient to remove volatile catalyst contaminants and to expose catalyst surfaces active for polymerization, removing substantially all gases from said activation zone, and cooling the thus degassed catalyst to a polymerization temperature in the range of —10° to 400° F.

9. A process in accordance with claim 1 wherein said olefin monomer is at least one monomer selected from the group consisting of 1-olefins and diolefins having 2 to 8 carbon atoms per molecule and no branching nearer the double bond than the 4-position.

10. A process for polymerizing olefins which comprises grinding a finely divided catalyst material consisting of carbon black at a temperature of at least 400° F. and a subatmospheric pressure below $10^{-3}$ mm. Hg for a period of time sufficient to remove volatile catalyst components, contacting an olefin monomer with the thus degassed catalyst under polymerization conditions while continually exposing a fresh catalyst surface active for polymerization of said monomer, and recovering a polyolefin product.

11. A process for polymerizing olefins which comprises grinding a finely divided catalyst material consisting of graphite at a temperature of at least 400° F. and a subatmospheric pressure below $10^{-3}$ mm. Hg for a period of time sufficient to remove volatile catalyst components, contacting an olefin monomer with the thus degassed catalyst under polymerization conditions while continually exposing a fresh catalyst surface active for polymerization of said monomer, and recovering a polyolefin product.

12. A process for polymerizing olefins which comprises grinding a finely divided catalyst material consisting of carbon at a temperature of at least 400° F. and a subatmospheric pressure below $10^{-3}$ mm. Hg for a period of time sufficient to remove volatile catalyst components, contacting an olefin monomer with the thus degassed catalyst under polymerization conditions while continually exposing a fresh catalyst surface active for polymerization of said monomer, and recovering a polyolefin product.

13. A process for polymerizing olefins which comprises grinding a finely divided catalyst material consisting of boron at a temperature of at least 400° F. and a subatmospheric pressure below $10^{-3}$ mm. Hg for a period of time sufficient to remove volatile catalyst components, contacting an olefin monomer with the thus degassed catalyst under polymerization conditions while continually exposing a fresh catalyst surface active for polymerization of said monomer, and recovering a polyolefin product.

14. A process for polymerizing olefins which comprises grinding a finely divided catalyst material consisting of silicon at a temperature of at least 400° F. and a subatmospheric pressure below $10^{-3}$ mm. Hg for a period of time sufficient to remove volatile catalyst components, contacting an olefin monomer with the thus degassed catalyst under polymerization conditions while continually exposing a fresh catalyst surface active for polymerization of said monomer, and recovering a polyolefin product.

15. A process for polymerizing olefins which comprises grinding a finely divided catalyst material consisting of iron at a temperature of at least 400° F. and a subatmospheric pressure below $10^{-3}$ mm. Hg for a period of time sufficient to remove volatile catalyst components, contacting an olefin monomer with the thus degassed catalyst under polymerization conditions while continually exposing a fresh catalyst surface active for polymerization of said monomer, and recovering a polyolefin product.

References Cited by the Examiner
UNITED STATES PATENTS

| | | | |
|---|---|---|---|
| 2,891,041 | 6/59 | Matlack | 260—94.9 |
| 2,891,042 | 6/59 | Matlack | 260—94.9 |
| 2,938,020 | 5/60 | Matlack | 240—94.9 |

JOSEPH L. SCHOFER, *Primary Examiner.*

L. H. GASTON, M. LIBMAN, WILLIAM H. SHORT, *Examiners.*